April 16, 1963    GERT ZOEGE V. MANTEUFFEL    3,085,443
DEVICE FOR MEASURING ANGULAR ACCELERATION
Filed Aug. 24, 1959

WITNESSES:
Bernard R. Gregway
D. J. Straitiff

INVENTOR
Gert Zoege V. Manteuffel
BY T. W. Brodahl
ATTORNEY

United States Patent Office 3,085,443
Patented Apr. 16, 1963

3,085,443
DEVICE FOR MEASURING ANGULAR ACCELERATION
Gert Zoege v. Manteuffel, Nuremberg, Germany, assignor to Siemens-Schuckertwerke Aktiengesellschaft, Erlangen, Germany, a corporation of Germany
Filed Aug. 24, 1959, Ser. No. 835,527
Claims priority, application Germany Aug. 27, 1958
4 Claims. (Cl. 73—505)

This invention relates to devices for measuring angular acceleration of bodies, and more particularly to an improved device of such type.

Previously, bodies, particularly aircraft and vehicles or parts thereof, were stabilized by first measuring the angular deviation, the angular velocity and the angular acceleration, and by then utilizing these measurements for a control or regulation. This method then was simplified by taking only one direct measurement and by then deriving the other values therefrom, for example, through electrical conversion.

Heretofore the angular acceleration was directly measured by means of an apparatus having a restrained gyroscope, or by means of two linear acceleration measuring devices which are located in the body to be controlled and considerably spaced apart from each other, and the measurements of which are oppositely applied. Such arrangement has the disadvantage that, when used with bodies of considerable length, and of not entirely rigid construction, there will be introduced errors resulting from the fact that due to the great distance required between the two senser means, vibration of the fuselage, hull or the like are incorrectly indicated as changes of direction. This situation exists particularly with aircraft.

It is the prime object of the present invention to prevent the indication of such incorrect measurements. This object is attained, according to the invention, by providing an angular-acceleration measuring device comprising a system of oscillating masses pivoted without friction at its center of gravity, and restrained by means of heavy springs, that is, a system having a high resonant frequency, the deflections of said system being measured by electric sensing means operating without friction. Such angular-acceleration measuring device embodying the teaching of the invention may be essentially smaller in size than known devices of this type so that deformations of the body to be stabilized will have no effect upon the measurement.

Other objects and advantages of the invention will become apparent from the following detailed description when taken in connection with the accompanying drawings, in which.

For a better understanding of the mode of operation of the device embodying the teachings of the invention, the following is a discussion of some known facts which are of great importance in the measurement of oscillations.

In evaluating an oscillation measurement, fidelity of phase, and fidelity of amplitude are essential. These are determined on the one hand by the tuning λ as the ratio between the measuring frequency (interfering frequency) and the inherent frequency, and on the other hand by the damping δ, that is, the logarithmic decrement of two amplitudes following each other in the same direction.

Figure 1:
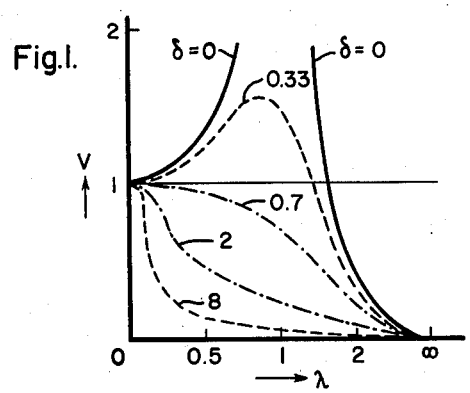
FIG. 1 shows the dependency of the gain factor V upon the tuning λ at different amounts of damping δ.
Figure 2:
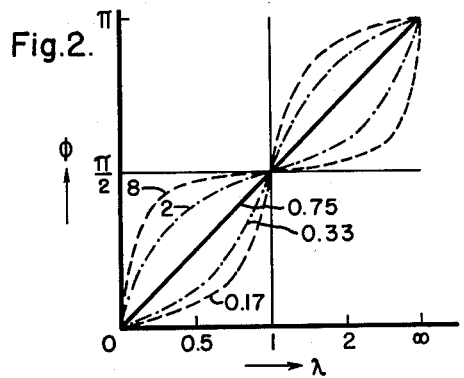
FIG. 2 shows the dependency of the phase lag φ upon the tuning λ at different amounts of damping δ. Both figures are based on the so-called Klotter scale.

As can be seen from FIG. 1, a fidelity of amplitude is ensured by a damping δ=0.75 up to about the tuning λ=0.6. The fidelity of phase is characterized by a log linearly increasing with the tuning λ. Therefore, it is a general endeavor to obtain a value at δ=0.7 which possibly remains constant throughout the entire temperature region.

With an oscillator restrained by springs, the following natural frequency $f_0$ is obtained:

(1) $$f_0 = \frac{1}{2\pi}\sqrt{\frac{C}{J}}$$

wherein C is the specific restraining force, and J is the inertia moment.

Without considering the delay factor V, the moment effecting the deflection to be measured will be:

(2) $$M = J.\alpha = C.\epsilon$$

Wherein $\alpha$ is the angular acceleration, and $\epsilon$ is the deflection of the oscillator. From both equations there is derived the measuring angle:

(3) $$\epsilon = \alpha/(2\pi f_0)^2$$

The extent of travel of the oscillator at a certain measuring angle is:

(4) $$s = \epsilon.r_L$$

wherein $r_L$ is the radius measured upon inductive sensing from the oscillation axes to the air gap.

From the Equations 3 and 4 it follows that, at a certain inherent frequency of the oscillating system, the sensitiveness at the sensing point depends solely upon the measuring radius.

However, the greater the restraining force acting upon the oscillator, the smaller will be the measuring angle and, thus, the measuring movement or travel. Therefore, it is necessary to journal the oscillator, in a manner known per se, by means of leaf-springs or cross-type leaf-spring joints so as to be without friction and free from play, and to arrange links, which may be necessary to transmit forces, in a similar manner. At the same time it is necessary to provide sensing means which in such short travels will furnish measured values of sufficient strength. Such sensing means may comprise, for example, two inductive senser elements including an E-shaped part and an I-shaped part, wherein the E-shaped elements may carry, for example, a primary inductive winding and two secondary inductive windings, the voltages of which are individually opposed but in series for both sensing means. Upon a relative movement of the E-shaped and I-shaped members, the oppositely directed change of the permeance will result in the induction of voltages. In this connection, it is possible to make movable either the E-shaped elements or the I-shaped element or both. By using sensing means wherein all requirements for insuring a perfect symmetry of the movable members are strictly satisfied, a shifting of the center of gravity due to temperature changes can be prevented.

Figure 3:
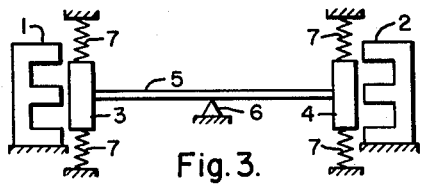
FIGS. 3 to 6 illustrate various embodiments of the invention.

In FIG. 3 there are shown two senser elements 3 and 4 which are connected together by a beam 5 to constitute an I-shaped senser unit pivoted at 6, and which are restrained in their movements by means of two heavy springs 7. In all the embodiments shown, said senser unit is pivotally mounted in a spring-type universal joint which has neither play nor friction, said pivot being symbolically indicated in the drawings by a knife-edge support. The senser elements 3 and 4 having a suitable mass have associated therewith stationary E-shaped sensing elements 1 and 2, respectively, said members being provided with inductive windings not illustrated in the drawings. When the body to be controlled changes its directions, the elements 1 and 2 are carried in unison therewith, whereas the elements 3 and 4 will not participate in said movement at first, due to their inertia, so that a relative displacement will take place therebetween corresponding to the angular-acceleration. This will cause corresponding voltages to be induced in the inductive coils, said voltages being a measure of the relative displacement and, consequently, of the angular-acceleration.

Figure 4:
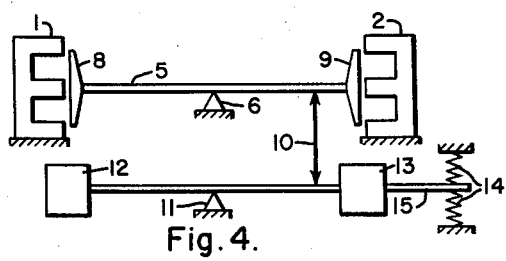

FIG. 4 shows a modification of this most simple arrangement. In this second embodiment, the I-shaped movable senser unit is of light weight but is coupled to a substantially heavier oscillator. The stationary E-shaped sensing elements are again indicated at 1 and 2 while 8 and 9 designate the senser elements which practically have no mass. The senser elements 8 and 9 are connected together by means of a beam 5 pivoted at 6 to constitute the I-shaped senser unit. Two mass members 12 and 13 which are connected together by means of the beam 15 pivotally supported at 11 are coupled with the oscillating I-shaped senser unit through a link 10 secured to both beams 15 and 5. The beam is restrained in its movement by heavy springs 14. Here again the E-shaped sensing elements 1 and 2 carry inductive winding (not shown) for inducing measuring voltages.

Figure 5:
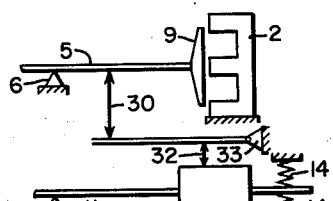

In order to increase the deflections of the I-shaped senser unit with respect to the stationary E-shaped sensing means, a mechanical transmission may be provided between the auxiliary oscillator and the measuring oscillator proper, as shown in FIG. 5, said transmitting means being adapted to amplify the deflection of the auxiliary oscillator and to transfer such deflections to the measuring oscillator. In the embodiment shown in FIG. 5, a mass member 13 is connected through a link 32 to a lever 31 pivotally mounted at 33 and adapted to transmit the movement of said mass member to the beam of the measuring oscillator through a link 30. The transmission ratio of the equidirectional movements of both oscillating systems is determined by the spacing of said links with respect to the pivot 33 and to the pivots 6 and 11.

With the embodiments illustrated above, it is necessary to provide, in addition to the stationary, E-shaped sensing elements which have a great mass, additional oscillating masses which are pivotally mounted and, as the case may be, connected to separate I-shaped senser units. Obviously then, these requirements increase the weight of the apparatus considerably which is of particular disadvantage if said apparatus is utilized in aircraft.

A further embodiment of the invention eliminates the need for such additional masses by providing E-shaped sensing elements which are arranged so as to permit oscillation thereof, and which are so connected to the movable I-shaped senser unit (which is of as little mass as possible) that the movements of said E-shaped sensing elements and said I-shaped senser unit will always be in opposite directions. For this purpose, the two oscillating parts are coupled by a lever transmission, and provision is made by fixedly securing the inductive windings carried by said E-shaped sensing element to prevent any displacement of the center of gravity. The great net weight of the E-shaped sensing elements results in a sufficient moment of inertia of the main oscillator. In view of the fact that the other oscillator formed by the I-shaped senser unit performs movements in the opposite direction, its moment of inertia will counter-act the moment of inertia of the first oscillator part, namely, with the corresponding transmission by the lever, multiplied by the square of the transmission ratio. Therefore, the moment of inertia of the measuring oscillator must not be more than a small fraction of the moment of the inertia of the main oscillator lest the sensitiveness of the measuring device be impaired. This requirement, however, can be easily met by a careful selection of the elements.

Figure 6:
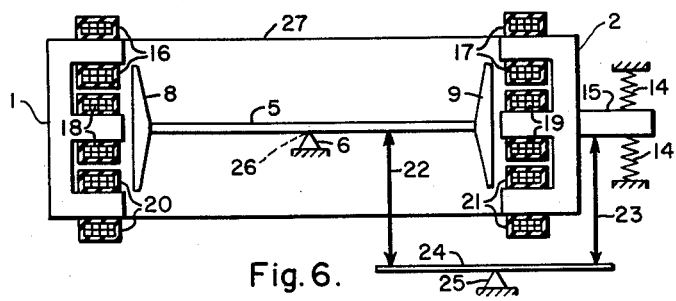

An embodiment of such oppositely acting oscillator is shown in FIG. 6. The main oscillator having the greater moment of inertia is formed by the two E-shaped sensing elements 1 and 2 which are rigidly connected together by means of a link 27 pivotally supported at 26. Each of the sensing elements 1 and 2 may have a primary winding 18 and 19 mounted on the central leg thereof as well as two oppositely connected secondary windings 16 and 20 and 17 and 21, respectively, mounted on outer legs thereof for generating measuring voltages upon an opposite change of the permeance resulting from a relative movement of the two oscillating systems. The senser elements 8 and 9 are again connected together through a beam 5 as an I-shaped senser unit pivotally supported at 6, it being desirable to provide the pivot 6 and 26 at the centers of gravity and along one straight line. The mass moment of inertia of this system is essentially smaller than the one mentioned first. The link or connecting piece 27 has an extension 15 which is acted upon on both sides thereof by strong springs 14, for example, which constitute a strong restraining force for the moment of the oscillator. A lever transmission is provided to enforce said oppositely directed movement of the two oscillators, said lever transmission comprising a twin lever 24 pivotally supported at 25, and positively connected through links 22 and 23 to the beam 5 and to said extension 15 of the main oscillator.

In the present case, the working points of the levers 22 and 23 have been so chosen that a certain mechanical translation is obtained which will result, as explained hereinafter, in a sensitiveness the optimum of which depends upon the ratio of inertia.

If two mass type oscillators are coupled so as to produce oppositely directed movements thereof, the inertia effect decreases by the factor $(1-\ddot{u}^2/\theta)$, wherein $\ddot{u}$ is the mechanical translation between the two oscillators, and $\theta = J_1 : J_2$ is the ratio of the mass moments of the inertia of the two oscillators. On the other hand, the travel resulting from the oppositely directed movements of the two oscillators increases only by $(1+\ddot{u})$. From this it follows that the sensitiveness of the measuring system is a function $f$ $(1+\ddot{u}-\ddot{u}^2/\theta-\ddot{u}^3/\theta)$ which reaches a maximum at a mechanical translation of (5) $\qquad \ddot{u}_{max} \approx \frac{1}{2}\sqrt{\theta} \approx \frac{1}{2}\sqrt{J_1 : J_2}$ Therein, the sensitiveness increases corresponding to the measuring ratio by a factor of (6) $\qquad \sigma_{max} = \frac{3}{4}(1+\ddot{u}_{max})$ In the latter equation $\sigma_{max}$ is derived from the relation $\sigma = (s_E = s_I)/s_E$, wherein $s_E$ is the travel of oscillation of the E-shaped oscillator, and $s_I$ is the travel of oscillation of the I-shaped oscillator. Hence, the total measuring movement resulting from said oppositely directed movement is (7) $\qquad s = \epsilon . r_L . \frac{3}{4} . (1+\ddot{u}_{max})$ From the above explanation it appears to be clear that, for example, with a ratio of the moments of inertia of 36:1, the highest sensitiveness will be reached at a translation of $\ddot{u}=3$. Even with a measuring radius shortened by ⅔, the same sensitiveness can be achieved as with a single oscillator, since in this case also $\sigma_{max}=3$.

It will be understood that the invention is not limited in scope to the embodiments illustrated and described herein. Thus, the lever transmissions may be replaced by other equivalent mechanical transmissions functioning in a similar manner.

Also, the restraining senses shown may be replaced, for example, by the supporting spring means comprising leaf-springs arranged on one plane or crosswise. It may also be of advantage to use electric restraining means consisting, for example, of moving coils or pairs of moving coils supplied from said sensing means with direct current through amplifiers. But also in any one of these cases it is important to render the center of gravity immune from changes in temperature by providing all movable parts by pairs and by arranging them in perfect symmetry.

The oscillator can suitably be damped in known manner by means of a suitable fluid completely surrounding the oscillator in a casing not shown in the drawing.

I claim as my invention:

1. A device for measuring angular acceleration of a moving body, comprising a mass system having a friction-free pivotal mounting at its center of gravity and of symmetry, high-resonant-frequency spring means restraining rocking movement of said mass system, and friction-free electrical sensing means responsive to movement of said mass system, said electrical sensing means including at least two spatially-separated sensing elements provided with inductive windings and having an E-shaped cross-section, and said mass system including end sensor elements located adjacent to and movable relative to said E-shaped sensing elements, said end senser elements being positively connected together to form a substantially I-shaped configuration, wherein the aforesaid mass system including the positively connected end senser elements also includes a rockably-mounted strongly-restrained pair of masses arranged in parallel to said end senser elements, said end senser elements having a negligibly small mass as compared to said pair of masses.

2. A device for measuring angular acceleration of a body, comprising a mass system including a pair of end senser elements positively connected together as an I-shaped senser unit pivotally mounted at its center of gravity and of symmetry for friction free rocking movement and a pair of rockable masses similarly mounted and coupled to said end senser elements by transmission means whereby deflection of the latter effects increased deflection of the former; a pair of E-shaped electrical sensing elements associated with said end senser elements; and high-resonant-frequency spring means restraining rockable movement of said mass system.

3. A device for measuring angular acceleration of a body, comprising a mass system including a pair of spaced-apart, joined end elements pivotally supported at its center of gravity for friction free rockable movement, a pair of spaced-apart, joined electrical sensing elements disposed adjacent to said end elements, respectively, said pair of electrical sensing elements being pivotally supported at its center of gravity for friction free rocking movement, a lever transmission system linking the pair of end elements to said pair of electrical sensing elements for movement of the two pairs in opposite directions, and high-resonant-frequency spring means restraining such movement.

4. A device as set forth in claim 3, wherein the moment of inertia of the pair of end elements and of the pair of electrical sensing elements are correlated with the translation of their deflections to obtain a maximum of oppositely directed deflections, such correlation being represented by the equation $ü = \frac{1}{2}\sqrt{J_1 : J_2}$, wherein $J_1$ and $J_2$ are the moments of inertia, $J_1 \gg J_2$, and wherein $ü$ is the transmission ratio to be selected.

References Cited in the file of this patent

UNITED STATES PATENTS

| | | |
|---|---|---|
| 1,936,321 | Ambronn | Nov. 21, 1933 |
| 2,062,784 | Green | Dec. 1, 1936 |
| 2,310,213 | Buchanan | Feb. 9, 1943 |
| 2,387,223 | Carson | Oct. 16, 1945 |
| 2,390,187 | Sharpe | Dec. 4, 1945 |
| 2,498,118 | Weiss | Feb. 21, 1950 |
| 2,552,722 | King | May 15, 1951 |
| 2,656,519 | Sheppard | Oct. 20, 1953 |
| 2,759,157 | Wiancko | Aug. 14, 1956 |
| 2,898,538 | Rafferty | Aug. 4, 1959 |
| 2,912,657 | Schaevitz | Nov. 10, 1959 |

FOREIGN PATENTS

| | | |
|---|---|---|
| 1,060,073 | France | Nov. 18, 1953 |

OTHER REFERENCES

An article "New Method of Measuring Mechanical Vibrations," by H. C. Werner, from "Instruments" magazine, March 1942, pages 83–87 and 94, page 86.